United States Patent [19]
Godart

[11] 3,994,281
[45] Nov. 30, 1976

[54] HEAT GENERATOR OF THE COMBUSTION PRODUCT CONDENSATION TYPE AND PROCESS FOR HEATING A HEAT-CARRYING FLUID

[75] Inventor: Joseph Raoul Godart, Montignies-le-Tilleul, Belgium

[73] Assignee: Ateliers J. Hanrez Societe Anonyme, Monceau-sur-Sambre, Belgium

[22] Filed: Sept. 17, 1974

[21] Appl. No.: 506,711

[30] Foreign Application Priority Data
Sept. 25, 1973  Belgium .............................. 136032

[52] U.S. Cl. .............................. 126/361; 126/359; 122/20 A; 237/61; 237/63
[51] Int. Cl.² ........................................... F24H 1/10
[58] Field of Search ............... 237/8 A, 61, 63, 59; 126/350 R, 361, 362, 355, 359; 122/20 A

[56] References Cited
UNITED STATES PATENTS

| | | | |
|---|---|---|---|
| 2,626,107 | 1/1953 | Rollins | 237/63 |
| 2,635,815 | 4/1953 | Dalin et al. | 237/63 |
| 3,060,921 | 10/1962 | Luring et al. | 126/350 R |
| 3,204,629 | 9/1965 | Newton, Jr. | 126/350 R |
| 3,645,251 | 2/1972 | Black | 126/359 |
| 3,648,682 | 3/1972 | Bougard | 126/359 |

FOREIGN PATENTS OR APPLICATIONS
1,930,372  12/1970  Germany

Primary Examiner—John J. Camby
Assistant Examiner—Larry I. Schwartz
Attorney, Agent, or Firm—Stevens, Davis, Miller & Mosher

[57] ABSTRACT

A heat generator of the type condensing the combustion products of a liquid or gaseous hydrogen fuel suitable for the heating of a heat-bearing fluid, including a tank containing at the top a zone of direct contact between the heat-bearing fluid and the combustion products, a collector for the heat-bearing fluid coming from the zone of direct contact, a convection heat exchanger arranged in the path of the combustion products, a combustion zone at a pressure close to atmospheric pressure, and a conduit which connects the collector of the heat-bearing fluid to the convection heat exchanger and is provided with a pump for replacing under pressure the portion of the heat-bearing fluid coming from the collector and intended to pass through the convection heat exchanger.

7 Claims, 7 Drawing Figures

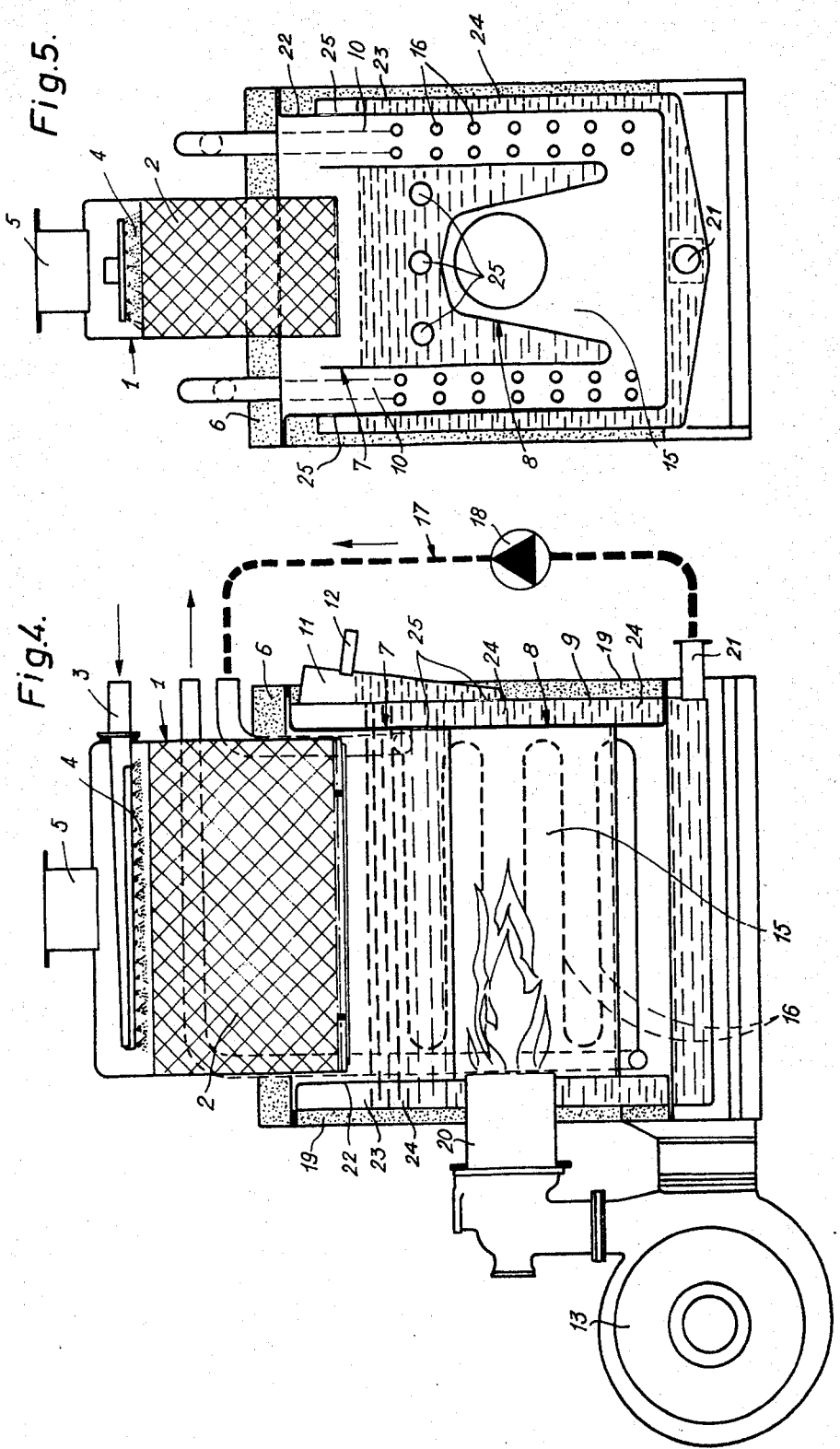

HEAT GENERATOR OF THE COMBUSTION PRODUCT CONDENSATION TYPE AND PROCESS FOR HEATING A HEAT-CARRYING FLUID

The object of the present invention is a heat generator of the type using condensation of the combustion products of a hydrogenized liquid or gaseous fuel, and a process for heating a heat-carrying fluid by means of this generator.

With a view to using at least partly the difference between the lower calorific power and the upper calorific power of a hydrogenized fuel such as natural gas, it has already been proposed to cool the combustion products to a temperature lower than that of their dew point by placing them in direct contact with cold heat-carrying fluid, either by submerged combustion, stirring the products of combustion into this fluid, or trickling or spraying the fluid into a chamber passed through by the products of combustion. In the case of the products of combustion from natural gas, the dew point is of the order of 58° C. It is therefore necessary for the temperature of the cold-heat-carrying fluid entering into direct contact with the hot combustion products to be substantially less than 58° C to be able to effect the condensation of a considerable part of the water vapor contained in the products of combustion and to profit from the heat of combustion and the latent heat given out from the condensed water. When the temperature of the cold heat-carrying fluid is approximately 40° C, or less, it is possible to obtain a yield of 90 to 95% in relation to the upper calorific power of the fuel. However, when the combustion is carried out at a pressure close to atmospheric pressure, it is not possible to heat the heat-carrying fluid to a temperature higher than 90° C, which is often desired in practice. It is known that by using a pressure higher than atmospheric pressure, by several bars, for example, to which all the fluids contained in the generator, comprising as much fuel and supporter of combustion as the products of combustion and the heat-carrying fluid, are subjected, it is possible to bring the latter to a temperature higher than 90° C, and generators having to carry out this programme have already been described.

Apart from the problems of construction involved in putting the generator fluids under pressure, this also requires a considerable consumption of energy. The recovery of this energy can only be partial, and further complicates the equipment required.

The heat generator according to the present invention makes it possible to effect the combustion of a liquid or gaseous fuel rich in hydrogen at a pressure close to atmospheric pressure, and to obtain the heat-carrying fluid with a temperature higher than 90° C.

To this end, the generator comprises, in a vat containing a zone of direct contact between the heat-carrying fluid and the products of combustion at the top, a collector for heat-carrying fluid coming from this zone, a heat exchanger operating by convection disposed in a passage of the combustion products and designed to be passed through by the heat-carrying fluid coming from the collector, and a combustion zone at a pressure close to atmospheric pressure. It also comprises a pump which is inserted between the collector and the convection heat exchanger capable of putting under pressure the part of the heat-carrying fluid having to pass through the convection heat exchanger.

The collector of the heat-carrying fluid coming from the zone of direct contact with the products of combustion is disposed above the zone of combustion, and may, in addition, extend over the lateral walls of the zone of combustion. In this latter case, it comprises vents connecting the combustion zone to the said zone of direct contact.

The convection heat exchanger is arranged downstream from the combustion zone and upstream from the zone of direct contact of the heat-carrying fluid with the products of combustion. It may be disposed in the passage opening of the combustion products in the base of an inverted combustion chamber, but it can also be provided in the vents fitted in the collector of the heat-carrying fluid coming from the zone of direct contact with the products of combustion, or be divided over these two places.

The pump for placing the heat-carrying fluid under pressure is inserted in a conduit which connects the collector of heat-carrying fluid coming from the zone of direct contact with the products of combustion of the convection heat exchanger, and may comprise, branching off from it, conduits going to or coming from one or more devices for using the heat of the heat-carrying fluid, provided with means for regulating the flow and the direction of circulation.

To use this heat generator, named cold heat-carrying fluid having a temperature lower than that of the dew point of the products of combustion, is distributed above the zone of direct contact with the products of combustion, the heat-carrying fluid heated by this direct contact with the products of combustion to a named average temperature is accumulated in the collector, and is made to pass through the convection heat exchanger in which it is brought to a named high temperature, higher than 90° C according to the pressure to which it has been subjected, and this fluid is conveyed to one or more devices for using the heat.

In the most simple case, the high temperature heat-carrying fluid is conveyed to a device using the heat which is capable of cooling it to a low temperature in order, then, to return it to the zone of direct contact of the heat generator.

A large number of heat-using devices, such as central heating systems for buildings, are provided only for a difference in temperature limited, for example, to 20° C, between the input and output temperatures of the heat carrying fluid, whereas other heat-using devices require only a heat-carrying fluid of named average temperature, in particular heating plants for swimming pools, either to bring the water to the desired temperature, to maintain it at this temperature, or to bring the temperature of the atmosphere of an indoor swimming pool to the desired degree.

The heat generator according to the present invention henceforth enables the combination of methods of use in which the heat-carrying fluid of high temperature is conveyed to a device for using heat capable of cooling it to a temperature more or less approaching the named average temperature. In this case, at least some of the partially cooled heat-carrying fluid may be submitted to the intake of the pressure pump to convey it back to the convection heat-exchanger and then to provide for a heat-using device capable of cooling to a low temperature part of the partially cooled fluid or the heat-carrying fluid leaving the collector. This proportion of heat-carrying fluid having to pass to the named low temperature, is advantageously withdrawn in such a quantity as is necessary to cool the products of combustion to a temperature between 30° and 40° C. Experience has shown that this proportion is in the order of 20 to 30% of the total thermal power of the heat generator. The attached drawings show several embodiments of the invention by way of example.

Figure 2:
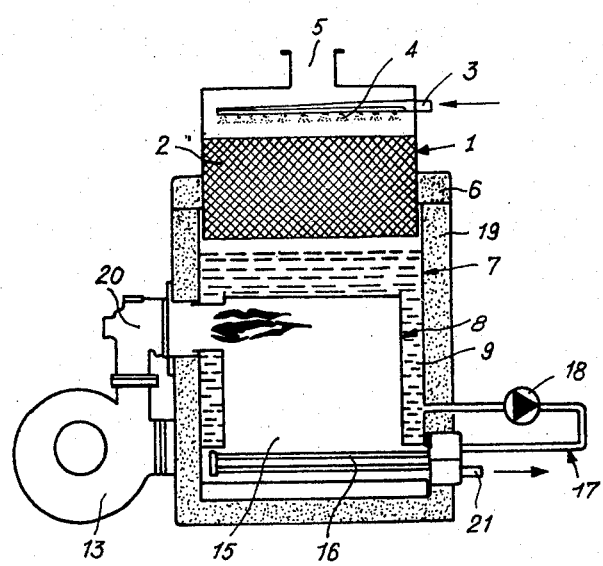
FIGS. 2 and 3 are longitudinal vertical sections and cross-sections of a heat generator with an inverted combustion chamber in which the convection heat exchanger is disposed in the output opening for the products of combustion at the bottom of this chamber.
Figure 3:
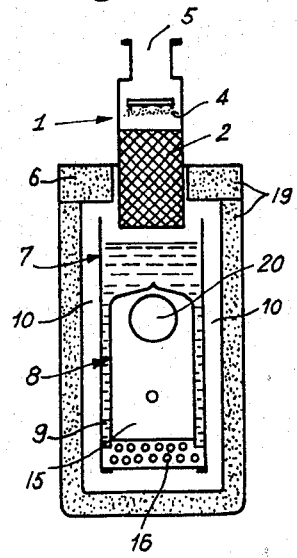
Figure 6:
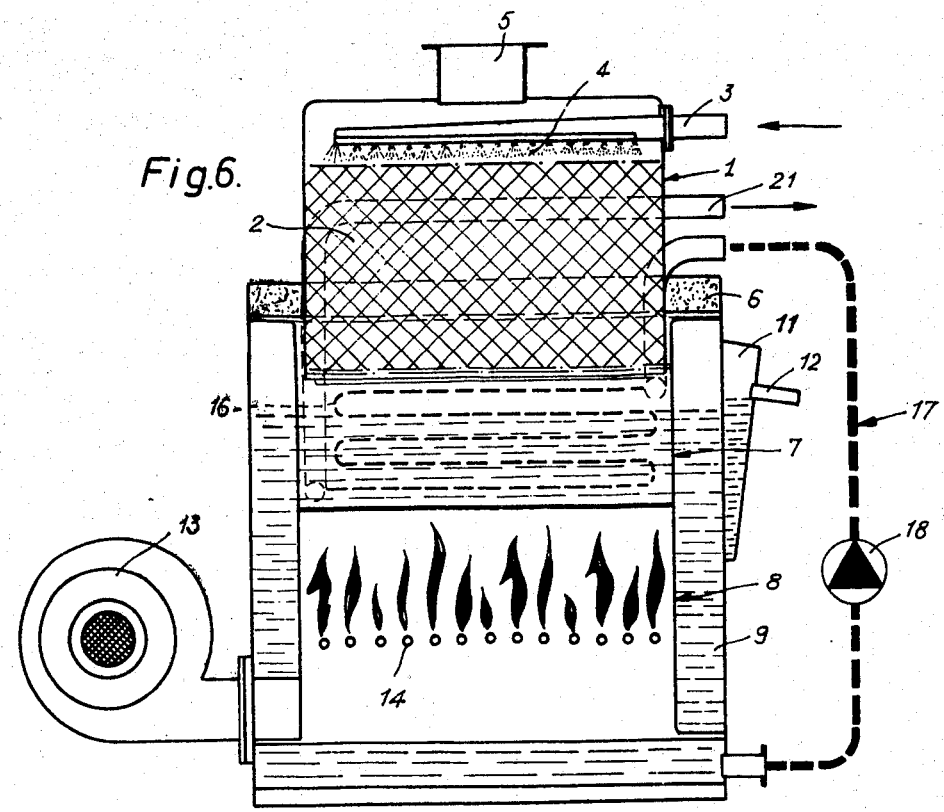
Figure 7:
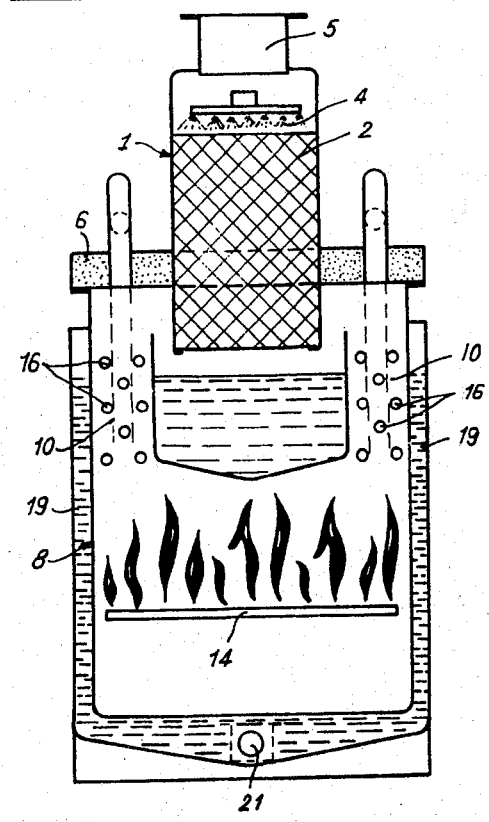

FIGS. 4 and 5, as well as FIGS. 6 and 7 are sections corresponding to those in FIGS. 2 and 3 of different heat generators according to the present invention.

As shown in all the figures, the heat generator comprises a zone of direct contact 1, in which the products of combustion, as they ascend, meet the descending cold heat-carrying fluid, which is finely divided, preferably by distribution substances 2. The heat-carrying fluid enters through a return conduit 3 terminating in a sprinkler 4 distributing the fluid over the entire surface of the distribution substances. The latter are contained in a vessel which is open towards the base and is provided above with a tubulure 5 through which the combustion products cooled by the fluid arriving through the conduit 3 escape. The vessel is partially engaged, through an opening provided in a lid 6, in the lower part of the heat generator, and can easily be dismounted to allow access to the inside of this lower part.

Disposed below the zone 1 is a collector 7 in which the fluid heated to a named average temperature by direct contact with the products of combustion is accumulated. This collector is arranged above a combustion zone 8 and advantageously surrounds this zone by means of the extensions 9 (FIGS. 2, 4, 6). In this case, vents 10 (FIGS. 3, 5, 7) are provided allowing the combustion products to be cleared from zone 8 and to pass to zone 1 in which they come into direct contact with the cold heat-carrying fluid. A constant level device 11 (FIGS. 4 and 6) with tube 12 for the discharge of the condensed liquid coming from the products of combustion normally forms part of the collector 7.

Figure 1:
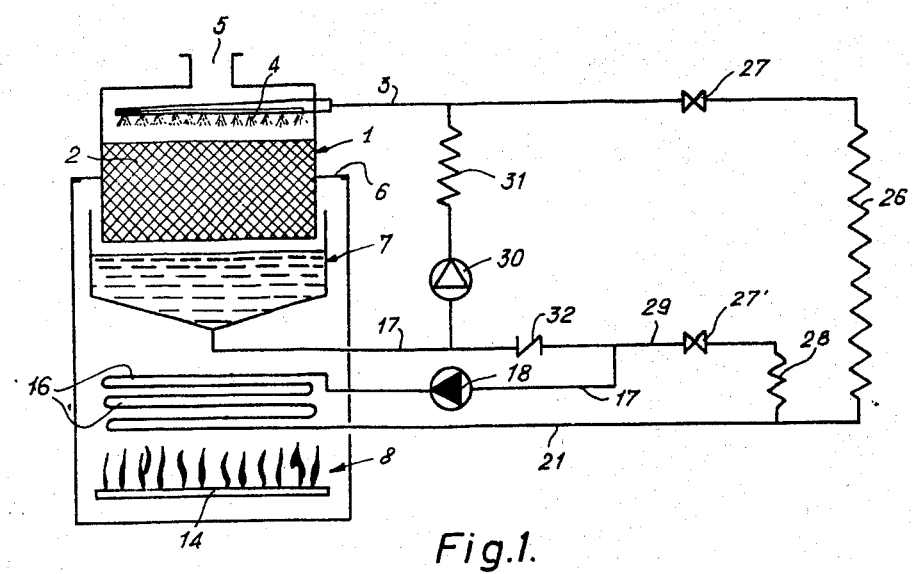
FIG. 1 is a schematic representation of a heat generator and different possibilities of using it.

The combustion zone is under slight pressure in comparison with atmospheric pressure, brought about by a ventilator 13 for the air supporting combustion (FIGS. 2, 4, 6), in order to overcome the pressure drop the combustion products undergo, particularly in the zone 1 of direct contact. It may comprise a grid of burners 14 (FIGS. 1, 6, 7) or an inverted combustion chamber 15 (FIGS. 2 to 5) open at the bottom.

As they pass through, the combustion products first of all meet a convection heat exchanger comprising one or more nests of tubes 16 which may be arranged at the opening in the bottom of an inverted combustion chamber 15 (FIGS. 2 and 3) or in some vents 10 (FIGS. 4 and 7). In accordance with the invention this convection heat exchanger is connected to the collector 7 by a conduit 17 (FIGS. 2, 4, 6) in which there is inserted a pump 18 for placing under pressure the heat-carrying fluid which has to pass through the nest or nests of tubes 16 to be heated there to the named high temperature, higher than 90° C, according to the pressure chosen for the high temperature fluid. Conduits leading to one or more devices for using the heat, as disclosed below, branch off from the pipe 17.

The heat generator according to FIGS. 2 and 3 comprises in the base of its lower section, provided with a heat insulating means 19, a combustion zone 8 in which a burner 20 of the pulsed air type forms a flame at the top of an inverted combustion chamber, surrounded above and laterally by heat-carrying fluid heated to a named average temperature in the zone 1 of direct contact and collected in the collector 7. The convection heat chamber with nest of tubes 16, smooth or ribbed, is disposed in the opening of the base of the combustion chamber, but could also be disposed in the vents 10 (as shown in FIGS. 4 to 7), or at both these places. The heat-carrying fluid, heated to a high temperature in the tubes 16, leaves the heat generator through a conduit 21 to be conveyed to a device for using the heat.

In the embodiments of the heat generator according to the FIGS. 4 and 5, as well as 6 and 7, the vents 10, in which the nests of tubes 16 are mounted, are contained in a detachable vat 22 which is closed by the lid 6 and engages in the outer vat 23 of the generator so as to leave a space 24 between these two vats which passes below the combustion zone too. This space is designed to be filled by heat-carrying fluid which penetrates in through openings 25 provided for this purpose in the wall of the vat 22.

The heat generator according to the invention has the advantage that it makes it possible to provide for the different possibilities of using the heat-carrying fluid which are desired in practice.

Thus if the using device represented symbolically by 26 (FIG. 1) permits direct cooling to the named cold temperature of the order of 40° C of the warm fluid leaving the generator through the conduit 21 at a temperature above 90° C, it is possible to reconvey it into the generator through the conduit 3 in which there is introduced a valve 27 reducing the pressure of the fluid to the atmospheric pressure, with a view to bringing it to the named average temperature in the zone of direct contact with the products of combustion, and to the named high temperature in the convection heat exchanger with tubes 16.

However, it may sometimes be difficult to provide devices 26 capable of reducing, in one stage, the temperature of the hot fluid to a named low temperature, lower than the dew point of the products of combustion. On the other hand, a part only of the heat carrying fluid in circulation is sufficient to reduce the temperature of the products of combustion, and finally, there are devices using heat which are preferably supplied with heat-carrying fluid of an average temperature. To satisfy these different conditions it is possible to provide instead of the circuit comprising a heat-using device 26 (or perhaps beside this device) a circuit comprising a using device 28 in which the high temperature fluid conveyed through the conduit 21 is cooled to a temperature approaching the named average temperature. By means of a conduit 29, in which is disposed a valve 27, for reducing pressure, the device 28 is connected to the conduit 17 so that the fluid coming from this device is extracted by the pressure pump 18 and reintroduced into the convection heat exchanger with tubes 16 to be brought to a high temperature again therein. Another circuit branching off from the conduits 17 and 3 comprises a circulation pump 30 and a heat-using device 31 in which fluid of average temperature is cooled to a low temperature. A one-way clack valve 32 disposed in the conduit 17 prevents the intake by means of the pump 30, of fluid conveyed through the conduit 29 into the conduit 17. The quantity of fluid of average temperature acting in the device 31 must be such that on the one hand the thermal action exercised by this device is satisfactory and that on the other hand it is sufficient to reduce the temperature of the products of combustion in the zone of direct contact 1 to a temperature lower than that of the dew point of these products.

A heat generator according to the present invention is capable of attaining thermal outputs of the order of 93 to 96% of the upper calorific power. Like all generators with condensation by direct contact of the heat-carrying fluid with the products of combustion, it also provides the advantage of discharging the products of combustion, washed and cooled, into the atmosphere. Simple plastics conduits can therefore advantageously be used as chimneys.

It is well understood that the present invention is not limited to the embodiments which are described above and illustrated in the attached drawings by way of example, and modifications thereto do not involve leaving its framework.

I claim:

1. A heat generator of the type condensing the combustion products of a liquid or gaseous hydrogen fuel suitable for the heating of a heat-bearing fluid, comprising: a tank containing at the top a zone of direct contact between the heat-bearing fluid and the combustion products; sprinkler means for delivering heat-bearing fluid to said zone of direct contact from above said zone of direct contact; a collector, located below said zone of direct contact, for the heat-bearing fluid coming from said zone of direct contact; a convection heat exchanger arranged in the path of the combustion products as the combustion products flow to said zone of direct contact; a combustion zone at a pressure close to atmospheric pressure; vent means, connected between said combustion zone and zone of direct contact, for enabling the combustion products to ascend and directly contact the heat-bearing fluid which is descending to said collector; means, above said zone of direct contact, for allowing the combustion products to escape from said tank; and a conduit which connects the collector of the heat-bearing fluid to the convection heat exchanger and is provided with a pump for placing under pressure a portion of the heat-bearing fluid coming from the collector and passing through the convection heat exchanger.

2. A heat generator according to claim 1 wherein the combustion zone comprises an inverted combustion zone and the convection heat exchanger is arranged in the path of the combustion products in the bottom of the inverted combustion chamber.

3. A heat generator according to claim 1, wherein the convection heat exchanger is arranged in the vent means.

4. A heat generator according to claim 1, wherein the conduit connecting the collector of the fluid coming from the zone of direct contact to the convection heat exchanger comprises, connected to the conduit, additional conduits extending to or coming from one or more devices for the utilization of the heat of the heat-bearing fluid, which additional conduits are provided with means for regulating the rate and direction of flow of fluid.

5. A method of using a heat generator of the type condensing the combustion products of a liquid or gaseous hydrogen fuel suitable for the heating of a heat-bearing fluid, and including a tank containing at the top a zone of direct contact between the heat-bearing fluid and the combustion products, a collector for the heat-bearing fluid coming from said zone, a convection heat exchanger arranged in the path of the combustion products, a combustion zone at a pressure close to atmospheric pressure, and a conduit which connects the collector of the heat-bearing fluid to the convection heat exchanger and is provided with a pump for placing under pressure the portion of the heat-bearing fluid coming from the collector and intended to pass through the convection heat exchanger, comprising the steps of: distributing above the zone of direct contact having the combustion products cold fluid having a temperature below that of the combustion products; collecting in the collector heat-bearing fluid heated to an average temperature by the direct contact of the fluid with the combustion products; passing at least a portion of the fluid having an average temperature through the pressurizing pump and compelling the portion of the fluid to pass through the convection heat exchanger in which it is brought to a high temperature above 90° C depending on the pressure to which it has been subjected; and conducting the heat-bearing fluid of high temperature towards one or more heat utilization devices.

6. A method according to claim 5 comprising conducting the heat-bearing fluid of high temperature towards a heat utilization device capable of cooling the high temperature fluid to a low temperature; and then conducting the cooled heat-bearing fluid again towards the zone of direct contact with the combustion products of the heat generator.

7. A method according to claim 5 comprising conducting the heat-bearing fluid of high temperature towards a heat utilization device to cool the high temperature fluid to a temperature close to the average temperature, subjecting at least a portion of the heat-bearing fluid partially cooled to the average temperature to the suction of the pressure pump in order to return the average temperature fluid into the convection heat exchanger, and then providing a heat utilization device capable of cooling to low temperature a portion of the partially cooled heat-bearing fluid or of the heat-bearing fluid emerging from the collector, said portion of partially cooled heat-bearing fluid being removed in a quantity such as is necessary to cool the combustion products to a temperature below that of their dew point.

* * * * *